US012273876B2

(12) United States Patent
Nunome et al.

(10) Patent No.: US 12,273,876 B2
(45) Date of Patent: Apr. 8, 2025

(54) TERMINAL, BASE STATION, TRANSMITTING METHOD, AND RECEIVING METHOD

(71) Applicant: Panasonic Intellectual Property Corporation of America, Torrance, CA (US)

(72) Inventors: Tomoya Nunome, Ishikawa (JP); Hidetoshi Suzuki, Kanagawa (JP); Takashi Iwai, Ishikawa (JP); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 493 days.

(21) Appl. No.: 17/442,572

(22) PCT Filed: Jan. 22, 2020

(86) PCT No.: PCT/JP2020/002050
§ 371 (c)(1),
(2) Date: Sep. 23, 2021

(87) PCT Pub. No.: WO2020/195061
PCT Pub. Date: Oct. 1, 2020

(65) Prior Publication Data
US 2022/0191902 A1    Jun. 16, 2022

(30) Foreign Application Priority Data
Mar. 28, 2019  (JP) ................................ 2019-064579

(51) Int. Cl.
*H04W 72/12*     (2023.01)
*H04W 72/1268*   (2023.01)
*H04W 72/044*    (2023.01)

(52) U.S. Cl.
CPC ...... *H04W 72/1268* (2013.01); *H04W 72/044* (2013.01)

(58) Field of Classification Search
CPC ....................... H04W 72/1268; H04W 72/044
See application file for complete search history.

(56) References Cited

U.S. PATENT DOCUMENTS 6,252,865 B1 * 6/2001 Walton .................. H04W 52/50
                                                    370/335
6,898,205 B1 * 5/2005 Chaskar ............. H04Q 11/0066
                                                    398/58
(Continued)

OTHER PUBLICATIONS

3GPP TS 38.211 V15.3.0, "3rd Generation Partnership Project; Technical Specification Group Radio Access Network; NR; Physical channels and modulation (Release 15)," Sep. 2018, 96 pages.
(Continued)

*Primary Examiner* — Brenda H Pham
(74) *Attorney, Agent, or Firm* — Seed IP Law Group LLP

(57) ABSTRACT

Provided is a terminal capable of improving utilization efficiency of an uplink resource in an unlicensed band. In a terminal (200), a transmission control unit (206) sets, in accordance with at least one of a data size and retransmission of uplink data, a first end position of a time resource which is set for the uplink data to a second end position. A transmission unit (210) transmits the uplink data on the basis of the second end position.

11 Claims, 11 Drawing Sheets

(56) References Cited

U.S. PATENT DOCUMENTS

| | | | | |
|---|---|---|---|---|
| 2005/0152357 A1* | 7/2005 | Stephens | ............... | H04L 5/0053 |
| | | | | 370/389 |
| 2019/0021101 A1* | 1/2019 | Wang | ................ | H04W 72/1268 |
| 2020/0014495 A1* | 1/2020 | Niu | ....................... | H04W 72/23 |

OTHER PUBLICATIONS

3GPP TS 38.212 V15.3.0, "$3^{rd}$ Generation Partnership Project; Technical Specification Group Radio Access Network; NR; Multiplexing and channel coding (Release 15)," Sep. 2018, 99 pages.

3GPP TS 38.213 V15.3.0, "$3^{rd}$ Generation Partnership Project; Technical Specification Group Radio Access Network; NR; Physical layer procedures for control (Release 15)," Sep. 2018, 101 pages.

3GPP TS 38.214 V15.3.0, "$3^{rd}$ Generation Partnership Project; Technical Specification Group Radio Access Network; NR; Physical layer procedures for data (Release 15)," Sep. 2018, 97 pages.

International Search Report, dated Mar. 24, 2020, for International Application No. PCT/JP2020/002050, 2 pages. (with English translation).

\* cited by examiner

100

200

TERMINAL, BASE STATION, TRANSMITTING METHOD, AND RECEIVING METHOD

TECHNICAL FIELD

The present disclosure relates to a terminal, a base station, a transmission method, and a reception method.

BACKGROUND ART

The specification for Release 15 of New Radio access technology (NR) has been completed for implementing the 5th Generation mobile communication systems (5G) in the 3rd Generation Partnership Project (3GPP). NR supports functions for realizing Ultra Reliable and Low Latency Communication (URLLC) as well as high-speed and large capacity that are basic requirements for enhanced Mobile Broadband (eMBB) (see, for example, Non Patent Literatures 1 to 4).

In Release 15 NR, "Configured grant transmission" (or referred to as Grant-free transmission) is supported for transmission of uplink data (e.g., Physical Uplink Control Channel (PUSCH)). In the Configured grant transmission, a terminal (or also referred to as user equipment (UE)) semi-statically continues transmission based on predetermined transmission timings and radio resources.

Further, in Release 16 NR, studies have been carried out on NR-Unlicensed (NR-U) in which communication based on the radio access method in NR is performed in an unlicensed frequency band (or referred to as an unlicensed band). In the unlicensed frequency band, each apparatus performs carrier sensing (e.g., also referred to as Listen Before Talk (LBT)) before transmission to confirm whether a radio channel is in use by another system or terminal.

CITATION LIST

Non-Patent Literature

NPL 1
3GPP TS 38.211 V15.3.0, "NR; Physical channels and modulation (Release 15)," September 2018
NPL 2
3GPP TS 38.212 V15.3.0, "NR; Multiplexing and channel coding (Release 15)," September 2018
NPL 3
3GPP TS 38.213 V15.3.0, "NR; Physical layer procedure for control (Release 15)," September 2018
NPL 4
3GPP TS 38.214 V15.3.0, "NR; Physical layer procedures for data (Release 15)," September 2018

SUMMARY OF INVENTION

However, there is scope for further study on a method of transmitting an uplink signal in an unlicensed band.

One non-limiting and exemplary embodiment facilitates providing a terminal, a base station, a transmission method, and a reception method each capable of improving uplink resource utilization efficiency in an unlicensed band.

A terminal according to an embodiment of the present disclosure includes: control circuitry, which, in operation, configures a first end position of a time resource configured for uplink data to a second end position in accordance with at least one of a data size and/or retransmission of the uplink data; and transmission circuitry, which, in operation, transmits the uplink data based on the second end position.

It should be noted that general or specific embodiments may be implemented as a system, an apparatus, a method, an integrated circuit, a computer program, a storage medium, or any selective combination thereof.

According to an embodiment of the present disclosure, it is possible to improve uplink resource utilization efficiency in an unlicensed band.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
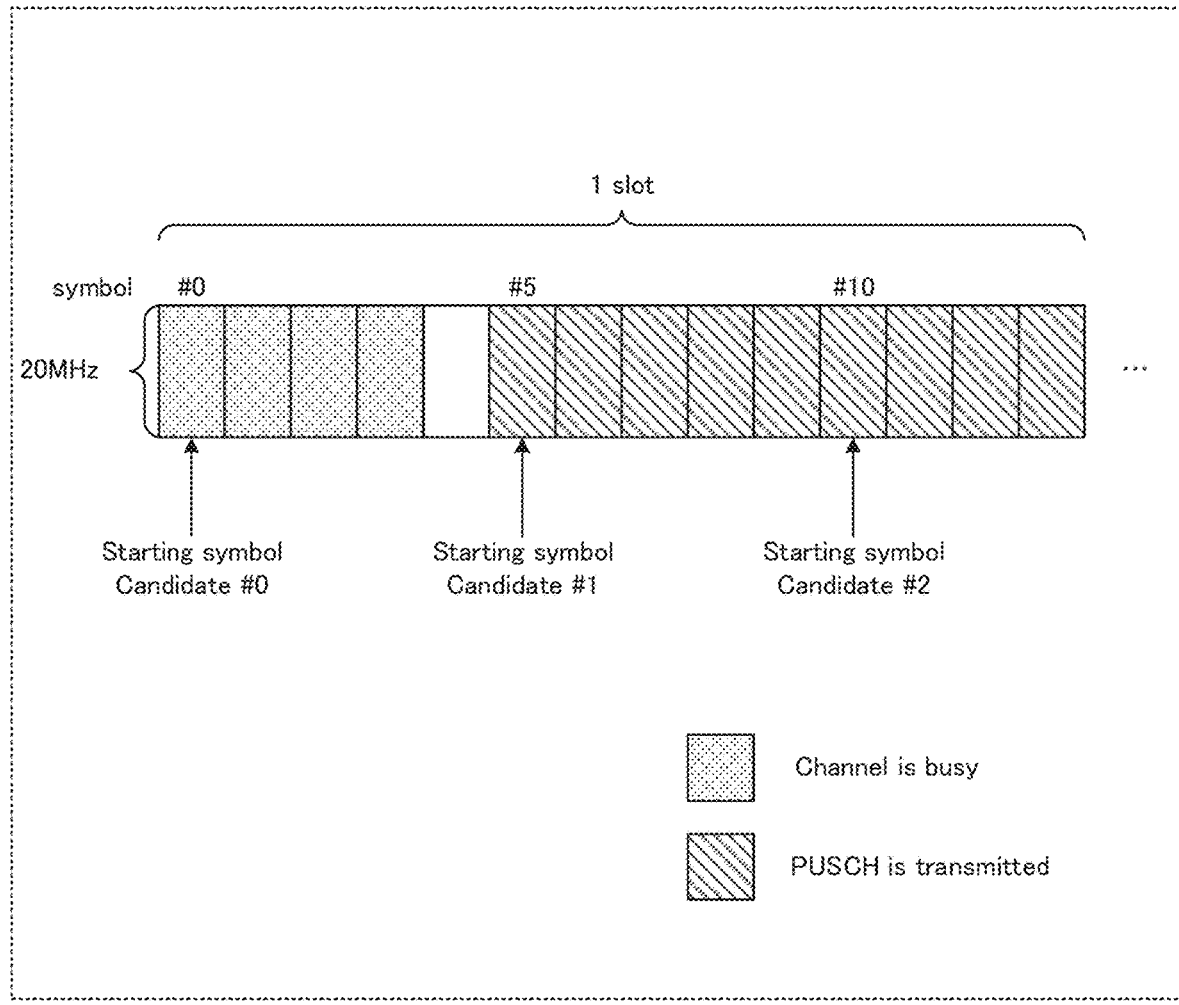
FIG. 1 illustrates exemplary Multiple starting symbols.

Hereinafter, embodiments of the present disclosure will be described in detail with reference to the accompanying drawings.

[Configured Grant Transmission]

Configured grant transmission for uplink data in Release 15 NR includes "Configured grant type 1 transmission" and "Configured grant type 2 transmission".

In Configured grant type 1 transmission, for example, Configured grant configuration information such as a Modulation and Coding Scheme (MCS), radio resource allocation information (e.g., allocation of time resources or frequency resources), a transmission timing, and the number of hybrid automatic repeat request (HARQ) processes is configured by terminal-specific higher layer signaling (e.g., Radio Resource Control (RRC)). When uplink data is generated, a terminal transmits a PUSCH using a predetermined Configured grant configuration information such as an MCS and a radio resource without a UL grant (in other words, dynamic scheduling information for uplink data) via a downlink control channel (e.g., Physical Downlink Control Channel (PDCCH)) from a base station (for example, also called gNB).

In Configured grant type 2 transmission, the Configured grant transmission is activated or released by a PDCCH (e.g., Downlink Control Information (DCI)) from the base station. In Configured grant type 2 transmission, the transmission timing, the number of HARQ processes, and the like are configured by the terminal-specific higher layer signaling as in Configured grant type 1 transmission. The MCS, radio resource allocation information, and the like are, however, configured by "Activation DCI" in Configured grant type 2 transmission. When uplink data is generated, the terminal transmits a PUSCH by semi-permanently using the Configured grant configuration information such as the MCS, radio resource, and the like configured by the higher layer signaling and the Activation DCI (in other words, without a UL grant).

Studies have been conducted on supporting the Configured grant transmission also in NR-U. For the Configured grant transmission in NR-U, functional enhancement from Release 15 NR is considered, for example, in order to comply with a restriction specific to an unlicensed frequency band (e.g., LBT operation).

[CBG Based Retransmission]

Retransmission control per Code Block Group (CBG) has been introduced to Release 15 NR.

The CBG is configured by grouping one or more Code Blocks (CBs). Additionally, a Transport Block (TB) is composed of one or more CBGs. For example, CBG based retransmission of uplink data allows the terminal to reduce an amount of transmission data compared with TB (e.g., all CBGs) based retransmission, thereby improving retransmission efficiency (i.e., resource utilization efficiency).

[Retransmission Control for Configured Grant Transmission in NR-U]

In terms of the retransmission control for the Configured grant transmission in NR-U, retransmission control without a UL grant in which explicit HARQ-ACK information (also simply referred to as HARQ-ACK in the following) for a PUSCH is fed back has been discussed, for example, in addition to the retransmission control with the UL grant. In the retransmission control by the explicit HARQ-ACK, the MCS and the radio resource allocation for the retransmission uplink data are, for example, possibly be the same as those at the time of initial transmission.

Incidentally, it is agreed that both the retransmission by the UL grant and the retransmission by the HARQ-ACK are introduced to the TB based retransmission, for example. Meanwhile, it is currently under discussion whether the retransmission by the HARQ-ACK is introduced to the CBG based retransmission while the retransmission by the UL grant is introduced.

[Multiple Starting Symbols]

It has been considered to introduce multiple starting symbols in a slot to the NR-U configured grant. The introduction of the multiple starting symbols allows the terminal to start uplink transmission from the starting symbol configured in the middle of the slot even when the LBT fails in a symbol around the beginning of the slot, for example, thereby increasing transmission occasions for the terminal. A plurality of candidates (e.g., referred to as starting symbol candidates) are configured for the positions of the multiple starting symbols, and may be signaled from the base station to the terminal or predetermined in the specification, for example.

FIG. 1 illustrates exemplary multiple starting symbols. By way of example, FIG. 1 illustrates a configuration of symbols in a single slot configured for the configured grant transmission.

For example, three starting symbol candidates are configured in the slot in FIG. 1. For example, symbol #0 is configured as starting symbol candidate #0, symbol #5 is configured as starting symbol candidate #1, and symbol #10 is configured as starting symbol candidate #2. Note that the starting symbol candidates are not limited to the example illustrated in FIG. 1.

In the example illustrated in FIG. 1, for example, the LBT is failed in symbols #0 to #3 in the slot (in other words, the channel is busy). Further, in the example illustrated in FIG. 1, the LBT is succeeded in symbol #5 (or symbol #4) in the slot (in other words, the channel is idle). In FIG. 1, the terminal can start transmitting uplink data (PUSCH) from symbol #5 (starting symbol candidate #1) where the channel is available among the starting symbol candidates.

In NR-U as described above, there is scope for further study on a method of improving the resource utilization efficiency for a plurality of terminals. In this regard, a method of transmitting (or retransmitting) uplink data in NR-U will be described in an embodiment of the present disclosure.

Embodiment 1

[Overview of Communication System]

Figure 2:
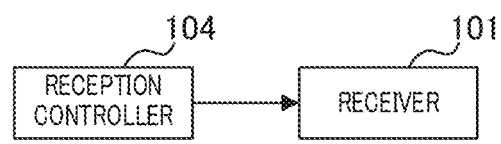
FIG. 2 is a block diagram illustrating an exemplary configuration of a part of a base station.
Figure 3:
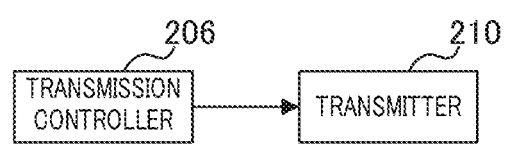
FIG. 3 is a block diagram illustrating an exemplary configuration of a part of a terminal.
Figure 4:
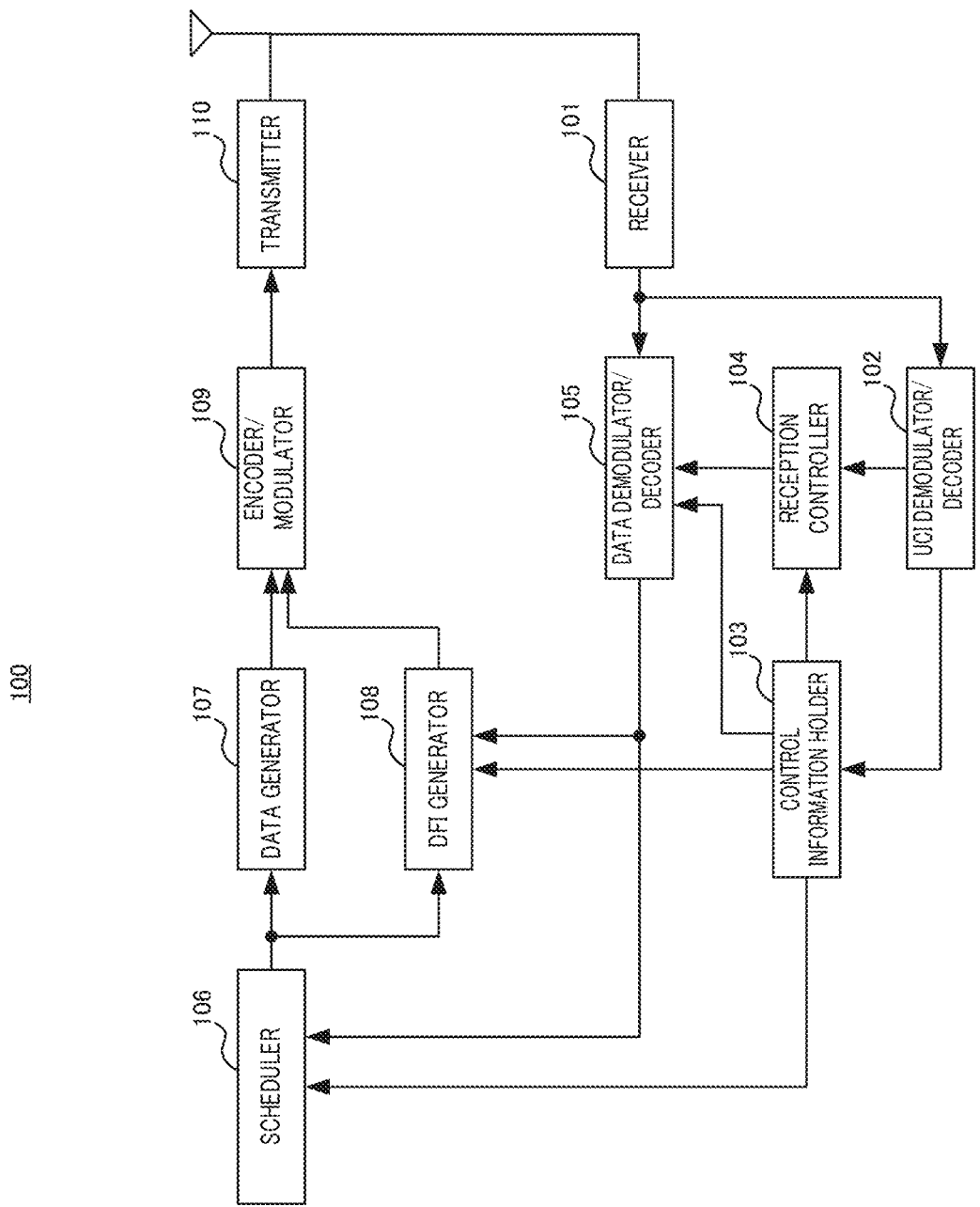
FIG. 4 is a block diagram illustrating an exemplary configuration of the base station.
Figure 5:
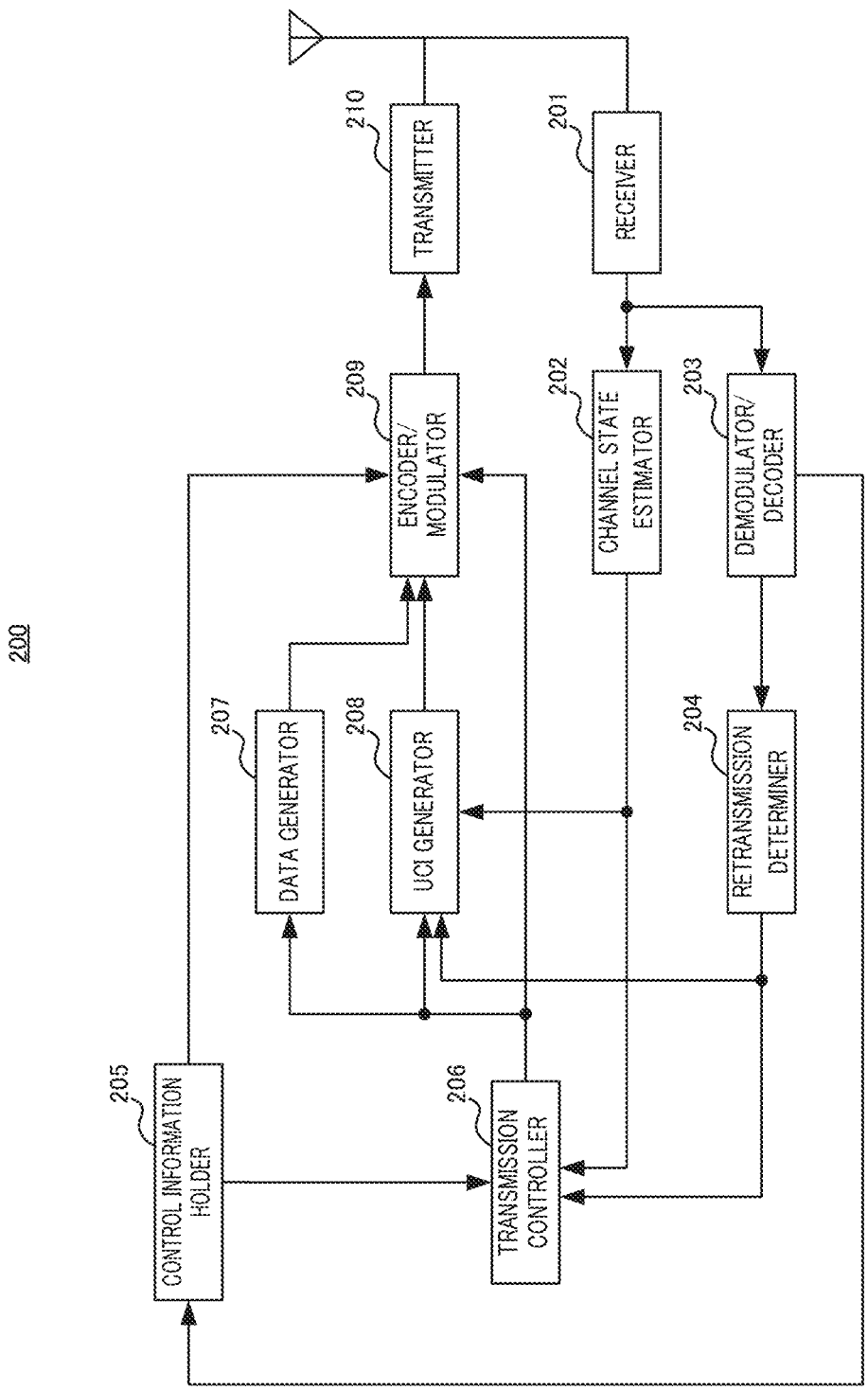
FIG. 5 is a block diagram illustrating an exemplary configuration of the terminal.

The communication system according to an embodiment of the present disclosure includes base station 100 (e.g., gNB) illustrated in FIGS. 2 and 4, and terminal 200 (e.g., UE) illustrated in FIGS. 3 and 5.

FIG. 2 is a block diagram illustrating an exemplary configuration of a part of base station 100 according to an embodiment of the present disclosure. In base station 100 illustrated in FIG. 2, reception controller 104 (e.g., corresponding to control circuitry) changes the first end position (e.g., ending symbol) of a time resource configured for uplink data to the second end position (e.g., ending symbol), in at least one of a case where the data size (e.g., the number of CBs or the number of CBGs) of the uplink data transmitted by terminal 200 is smaller than the data size configured for terminal 200 and a case of retransmission of the uplink data. Receiver 101 (e.g., corresponding to reception circuitry) receives the uplink data based on the second end position.

FIG. 3 is a block diagram illustrating an exemplary configuration of a part of terminal 200 according to an embodiment of the present disclosure. In terminal 200 illustrated in FIG. 3, transmission controller 206 (e.g., corresponding to control circuitry) changes the first end position of a time resource configured for uplink data to the second end position in at least one of a case where the data size (e.g., the number of CBs or the number of CBGs) of the uplink data to be transmitted is smaller than the configured data size and a case of retransmission of the uplink data. Transmitter 210 (e.g., corresponding to transmission circuitry) transmits the uplink data based on the second end position.

[Configuration of Base Station]

FIG. 4 is a block diagram illustrating an exemplary configuration of base station 100 according to an embodiment of the present disclosure. In FIG. 4, base station 100 includes receiver 101, Uplink Control Information (UCI) demodulator/decoder 102, control information holder 103, reception controller 104, data demodulator/decoder 105, scheduler 106, data generator 107, DFI generator 108, encoder/modulator 109, and transmitter 110.

Receiver 101 receives a signal transmitted from terminal 200 via an antenna, performs reception processing such as down-conversion or A/D conversion on the received signal, and outputs the received signal after the reception processing to UCI demodulator/decoder 102 and data demodulator/decoder 105.

UCI demodulator/decoder 102 demodulates and decodes an uplink control signal (e.g., UCI) included in the received signal inputted from receiver 101, and outputs the decoded UCI to control information holder 103 and reception controller 104.

Control information holder 103 holds Configured grant configuration information (e.g., MCS and radio resource allocation information) for each terminal 200, and outputs the held information to each component (e.g., reception controller 104, data demodulator/decoder 105, scheduler 106, or DFI generator 108) as necessary. Control information holder 103 also holds the control information (UCI) inputted from UCI demodulator/decoder 102, and outputs the held control information to scheduler 106 as necessary.

Reception controller 104 determines information on uplink data (e.g., the number of transmitted CBGs or an ending symbol to be described later) based on the control information inputted from control information holder 103 and the UCI inputted from UCI demodulator/decoder 102, and outputs the determined information to data demodulator/decoder 105.

Data demodulator/decoder 105 demodulates and decodes uplink data included in the received signal inputted from receiver 101 based on the control information inputted from control information holder 103 and the information on the uplink data inputted from reception controller 104, and outputs the decoding result of the uplink data to scheduler 106 and DFI generator 108. The decoding result of the uplink data may include, for example, information indicating success or failure of the decoding in units of TBs, CBGs or CBGs.

Scheduler 106, for example, indicates generation (or transmission) of transmission data to data generator 107 based on the control information (e.g., a data type or a data amount held in a buffer by terminal 200, or the Configured grant configuration information) inputted from control information holder 103. Scheduler 106 also controls retransmission of uplink data based on the decoding result of the uplink data inputted from data demodulator/decoder 105. For example, scheduler 106 indicates DFI generation (or DFI transmission) to DFI generator 108 when performing retransmission control by explicit HARQ-ACK information for the uplink data.

Data generator 107 generates transmission data according to the indication from scheduler 106, and outputs the generated transmission data to encoder/modulator 109.

DFI generator 108 generates DFI (e.g., payload of DFI) based on the decoding result (e.g., HARQ-ACK) of the uplink data inputted from data demodulator/decoder 105 and the Configured grant configuration information inputted from control information holder 103, in accordance with the indication from scheduler 106. DFI generator 108 outputs the generated DFI to encoder/modulator 109.

Encoder/modulator 109 encodes and modulates the transmission data inputted from data generator 107 and the DFI inputted from DFI generator 108, and outputs the modulated signals (symbol sequences) to transmitter 110.

Transmitter 110 performs transmission processing such as D/A conversion, up-conversion, or amplification on the signals inputted from encoder/modulator 109, and transmits radio signals obtained by the transmission processing to terminal 200 from the antenna.

[Configuration of Terminal]

FIG. 5 is a block diagram illustrating an exemplary configuration of terminal 200 according to an embodiment of the present disclosure. In FIG. 5, terminal 200 includes receiver 201, channel state estimator 202, demodulator/decoder 203, retransmission determiner 204, control information holder 205, transmission controller 206, data generator 207, UCI generator 208, encoder/modulator 209, and transmitter 210.

Receiver 201 performs reception processing such as down-conversion or AMD conversion on the received signal received via an antenna, and outputs the received signal to channel state estimator 202 and demodulator/decoder 203.

Channel state estimator 202 performs, for example, carrier sensing (e.g., LBT) based on the received signal inputted from receiver 201, and determines whether the channel state is busy or idle. Channel state estimator 202 outputs information indicating the determined channel state (i.e., LBT result) to transmission controller 206. Channel state estimator 202 also performs, for example, Channel state information (CSI) estimation, and outputs CSI to UCI generator 208.

Demodulator/decoder 203 demodulates and decodes the received signal inputted from receiver 201. Demodulator/decoder 203 outputs the decoded signal (e.g., DFI) to retransmission determiner 204. Demodulator/decoder 203 also extracts control information (e.g., the Configured grant configuration information) included in the decoding result, and outputs the extracted information to control information holder 205.

Retransmission determiner 204 determines data to be retransmitted (e.g., CBGs to be retransmitted) based on the signal (e.g., DFI) inputted from demodulator/decoder 203, and outputs retransmission information indicating the determination result to transmission controller 206. In addition, retransmission determiner 204 outputs, for example, information (e.g., HARQ-ACK) indicating a determination result for each CBG to UCI generator 208.

Control information holder 205 holds the control information (e.g., Configured grant configuration information) inputted from demodulator/decoder 203, and outputs the held control information to each component (e.g., transmission controller 206 or encoder/modulator 209) as necessary.

Transmission controller 206 determines a start position (e.g., starting symbol) and an end position (e.g., ending symbol) for uplink data (e.g., PUSCH) transmission based on the Configured grant configuration information (e.g., starting symbol position candidates, a configured TB size (or the number of CBs), or the number of configured symbols) inputted from control information holder 205, the number of transmission CBs, and the channel state (e.g., state of busy or idle) inputted from channel state estimator 202. Transmission controller 206 outputs resource information including the determined information to encoder/modulator 209.

Transmission controller 206 also determines a data generation indication (e.g., a type indicating initial transmission or retransmission, or transmission CB information) based on the retransmission information inputted from retransmission determiner 204, and outputs the data generation indication to data generator 207.

Further, transmission controller 206 outputs a UCI generation indication (e.g., information indicating which UCI is transmitted or which CBG is transmitted in which HARQ process) to UCI generator 208, based on the UCI configuration and the Configured grant configuration information inputted from control information holder 205, and the retransmission information inputted from retransmission determiner 204.

Data generator 207 generates transmission data (e.g., PUSCH) based on the data generation indication inputted from transmission controller 206, and outputs the transmission data to encoder/modulator 209.

When the type indicating initial transmission or retransmission is retransmission, data generator 207 may output the same data as in the initial transmission, or may output transmission data corresponding to the CBs to be retransmitted based on the transmission CB information.

UCI generator 208 generates UCI based on the UCI generation indication inputted from transmission controller 206, the CSI inputted from channel state estimator 202, and the HARQ-ACK inputted from retransmission determiner 204, and outputs the UCI to encoder/modulator 209. The UCI may include, for example, information on the data to be transmitted (e.g., CBs or CBGs), a data type or a data amount held in the buffer by terminal 200.

Encoder/modulator 209 encodes and modulates the transmission data inputted from data generator 207 and the UCI inputted from UCI generator 208 based on the resource information inputted from transmission controller 206 and the Configured grant configuration information inputted from control information holder 205, and outputs the modulated signals to transmitter 210.

Transmitter 210 performs transmission processing such as D/A conversion, up-conversion, or amplification on the signals inputted from encoder/modulator 209, and transmits radio signals obtained by the transmission processing to base station 100 from the antenna.

[Operations of Base Station 100 and Terminal 200]

Exemplary operations of base station 100 and terminal 200 having the above configurations will be described.

Figure 6:
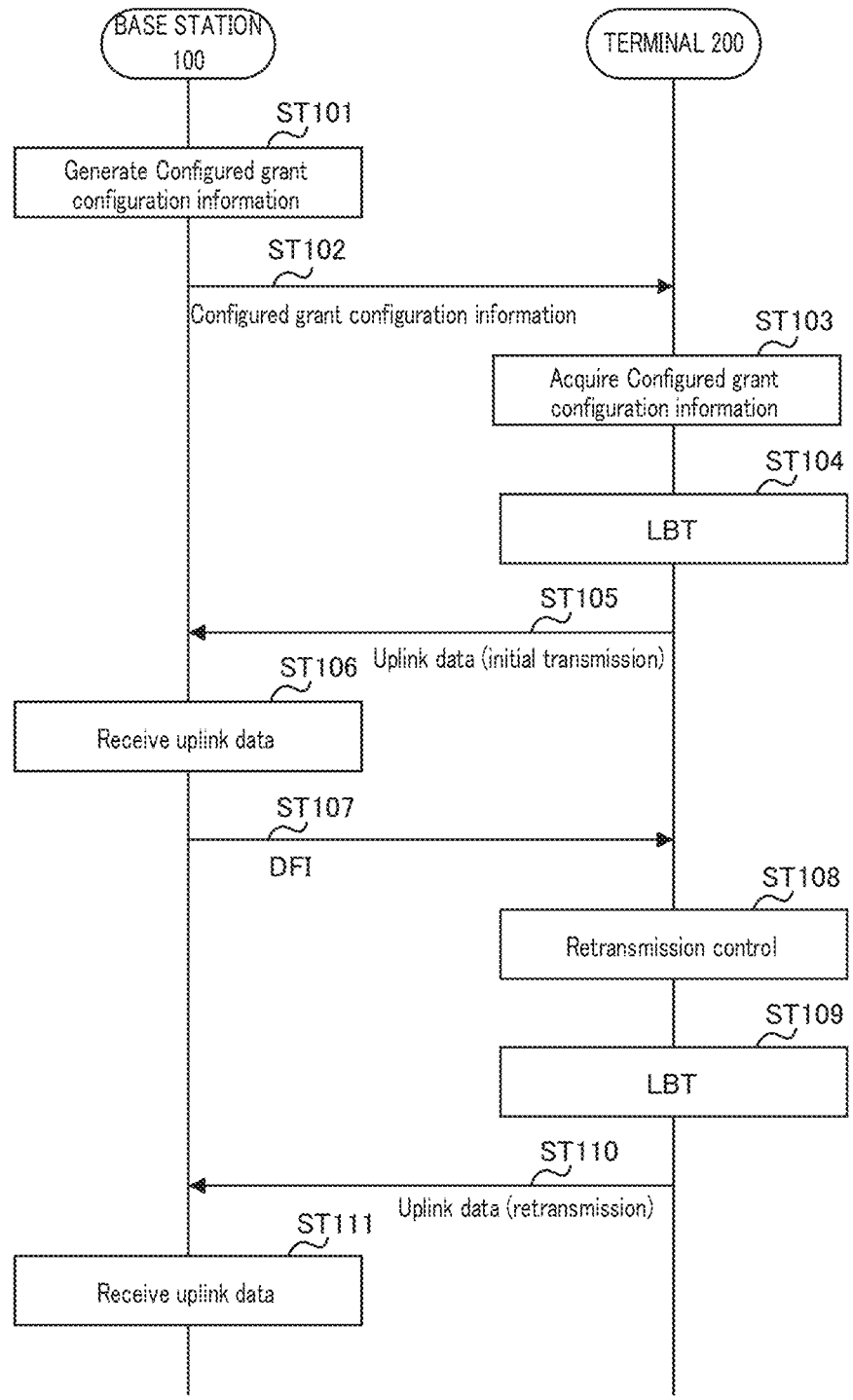
FIG. 6 is a sequence diagram describing exemplary operations of the base station and the terminal.

FIG. 6 is a sequential diagram illustrating the operations of base station 100 and terminal 200.

For example, base station 100 generates Configured grant configuration information based on scheduling information for terminal 200 (ST101). Base station 100 indicates the Configured grant configuration information to terminal 200 (ST102). Terminal 200 acquires the Configured grant configuration information indicated from base station 100 (ST103).

Terminal 200 performs LBT, for example, when uplink data is generated (ST104). When the LBT is succeeded (i.e., when a radio channel is idle), terminal 200 determines a symbol (i.e., a data size or a transmission start position) that is a time resource where the uplink data is to be mapped based on the Configured grant configuration information and the LBT result (e.g., a symbol where the LBT has been succeeded).

Terminal 200 transmits the uplink data in the determined time resource (ST105).

Base station 100 receives the uplink data (ST106), and transmits (i.e., feeds back) DFI including HARQ-ACK (e.g., ACK or NACK) for the uplink data to terminal 200 (ST107). Terminal 200 performs retransmission control for the uplink data (e.g., determines CBs or CBGs to be retransmitted) based on the HARQ-ACK included in the received DFI (ST108). For example, terminal 200 determines a transmission start position (starting symbol) and a transmission end position (ending symbol) of the uplink data (CBs or CBGs) to be retransmitted.

Terminal 200 performs LBT prior to the retransmission of the uplink data (ST109). When the LBT is succeeded (i.e., when a radio channel is idle), terminal 200 determines a symbol (i.e., the data size or the transmission start position) that is a time resource where the uplink data is to be mapped based on the LBT result (e.g., a symbol where the LBT has been succeeded).

Terminal 200 retransmits the uplink data in the determined time resource (ST110).

Base station 100 receives the retransmitted uplink data (ST111). At this time, base station 100, for example, determines the transmission start position (starting symbol) and the transmission end position (ending symbol) of the retransmitted uplink data (CBs or CBGs) as well as terminal 200.

[Coding Rate in Applying Multiple Starting Symbols]

Herein, a description will be given of a coding rate in a case of applying the Multiple starting symbols as illustrated in FIG. 1, for example.

In the case of applying the Multiple starting symbols, for example, transmission of uplink data (e.g., PUSCH) is possibly started from a symbol after a starting symbol (e.g., a leading symbol in a slot) configured for terminal 200. In other words, the starting symbol of the PUSCH may be changed (i.e., pushed back or shifted), for example, depending on the result of LBT.

In this case, when the ending symbol of the PUSCH is also pushed back in accordance with the starting symbol of the PUSCH being pushed back, for example, a resource for another terminal cannot be allocated to the symbols where the PUSCH is mapped as a result of the pushing back. In other words, the symbols where the PUSCH is mapped are possibly pushed back according to the LBT result in terminal 200, and the symbols possibly used for the pushed-back PUSCH are unavailable to another terminal. Resource utilization efficiency is thus reduced when the ending symbol of the PUSCH is also pushed back in accordance with the starting symbol of the PUSCH being pushed back.

In this regard, it is assumed that the ending symbol of the mapped PUSCH is not pushed back even when a start position of the starting symbol is changed.

In the case where the ending symbol is not pushed back, data in the PUSCH symbols are assumed to be punctured according to the pushing back of the starting symbol of the PUSCH to be mapped. In FIG. 1, the LBT result is busy in symbols #0 to #3, and thus the starting symbol of the PUSCH is pushed back to, for example, symbol #5, which is the next starting symbol candidate. Further, the ending symbol of the PUSCH is not pushed back, and is symbol #13 in FIG. 1, for example. In other words, the PUSCH in symbols #0 to #4 illustrated in FIG. 1 is punctured. Alternatively, in FIG. 1, the symbols to which the PUSCH is mapped may be pushed back by 5 symbols as a whole, and the PUSCH supposed to be mapped to symbols #9 to #13 may be punctured.

In this case, terminal 200 is highly likely to lack sufficient processing time to re-select the TB size according to the LBT result and to perform data generation, encoding, or rate matching according to the TB size. Thus, it is assumed that the data of terminal 200 (e.g., PUSCH mapped to symbols #0 to #4 in FIG. 1) that is pushed back and unable to be transmitted as a result of the LBT is discarded.

When the data is discarded, the PUSCH transmitted by terminal 200 is transmitted at a coding rate higher than the coding rate expected in base station 100. Accordingly, base station 100 may not be able to decode the PUSCH transmitted by terminal 200 properly. Thus, retransmission of the PUSCH is likely to occur when the Multiple starting symbols are applied and the starting symbol is pushed back.

In the example illustrated in FIG. 1, for example, terminal 200 transmits the PUSCH mapped to 9 symbols (symbols #5 to #13) according to the LBT result whereas base station 100 has scheduled (i.e., configured) the transmission of the PUSCH mapped to 14 symbols in a single slot. Accordingly, in the example illustrated in FIG. 1, the coding rate of the PUSCH actually transmitted from terminal 200 is 14/9 times the coding rate of the PUSCH scheduled by base station 100.

[Resource Allocation for Retransmission]

Retransmission by HARQ-ACK is performed, for example, in a Configured grant resource. For example, the size of a resource to be used for the retransmission may be the same as that of a resource used for initial transmission. The resource to be used for the retransmission, however, is less than the resource used for the initial transmission in some cases.

Figure 7:
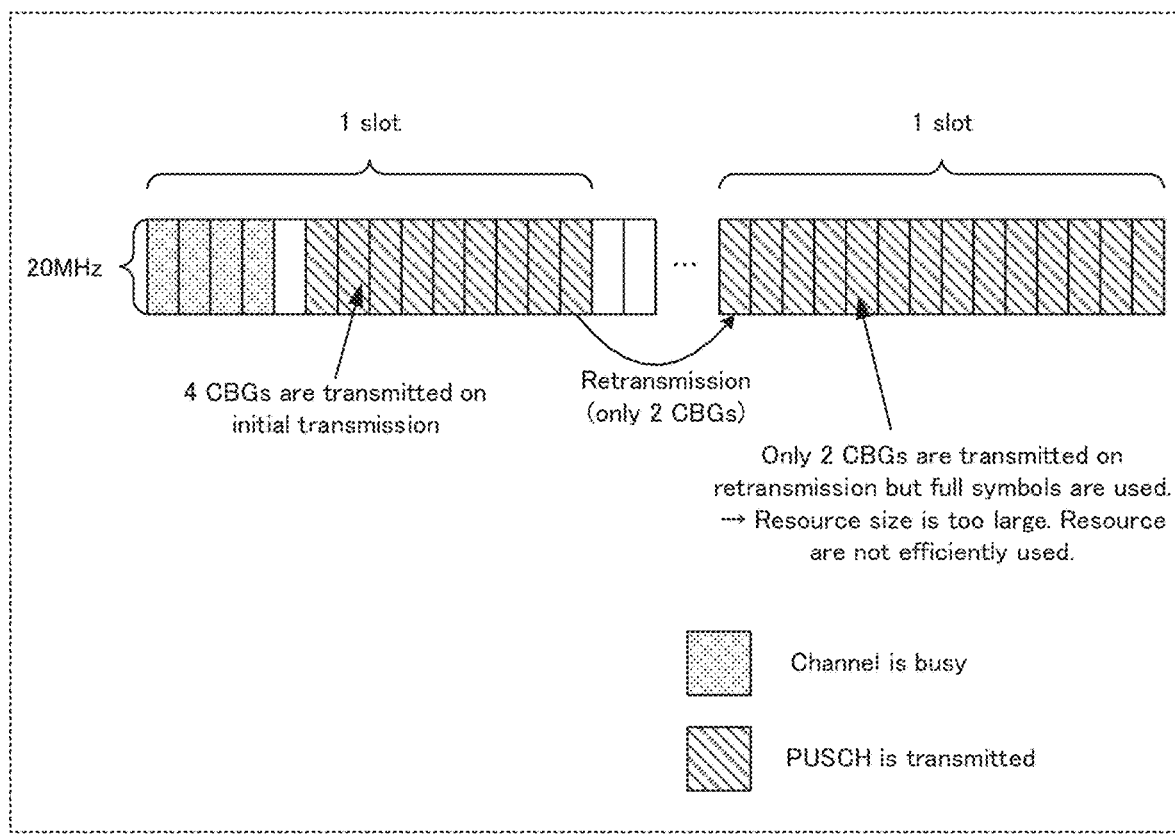
FIG. 7 illustrates exemplary PUSCH transmission.

FIG. 7 illustrates exemplary CBG based retransmission processing for a PUSCH. FIG. 7, for example, illustrates a case where the number of CBGs at the time of the initial transmission is 4 CBGs and 2 CBGs are failed to be transmitted. Note that the number of CBs included in each CBG is the same, and the CB size is also the same.

When the CBG based retransmission is performed in FIG. 7, the number of CBGs transmitted at the retransmission is 2 CBGs. Thus, in order to perform the retransmission (e.g., 2 CBGs) at the same coding rate as the coding rate configured at the time of the initial transmission (e.g., 4 CBGs), the resource may be about half of a Configured grant resource (14 symbols in FIG. 7) configured for the initial transmission.

When terminal 200 transmits, however, data of 2 CBGs in the Configured grant resource (in other words, the resource used for the initial transmission, e.g., 14 symbols) at the time of the retransmission (e.g., 2 CBGs) as illustrated in FIG. 7, the size of the resource allocated for the data to be retransmitted is too large (i.e., over-sized) compared to the size assumed by base station 100. In the example illustrated in FIG. 7, a coding rate of the PUSCH at the time of the retransmission is ½ of the configured coding rate, for example. This reduces resource utilization efficiency in the Configured grant resource.

In this regard, terminal 200 variably configures the ending symbol of the data to be mapped in accordance with the size of the data to be transmitted or the transmission type (e.g., either initial transmission or retransmission) in Configured grant transmission, in the present embodiment.

For example, terminal 200 changes an end position (e.g., ending symbol) of a time resource for a PUSCH configured a Configured grant to a different ending symbol, when the number of CBs of the PUSCH actually transmitted (hereinafter, also referred to as the number of transmission CBs) is less than the number of CBs configured by the Configured grant (i.e., data size) or when the PUSCH is retransmitted, for example. Thus, in the present embodiment, the ending symbol of the data to be mapped is sometimes different from the ending symbol configured in the Configured grant configuration (e.g., last symbol #13 in the slot in FIG. 7).

Methods of determining the ending symbol will be described in the following. Note that reception controller 104 of base station 100 and transmission controller 206 of terminal 200, for example, only need to share a method of determining the ending symbol (i.e., the end position of a time resource) to be described later, and determine the ending symbol of a PUSCH to be mapped based on the shared method.

<Determination Method 1>

In Determination Method 1, terminal 200 determines an ending symbol (i.e., changed ending symbol) of a time resource to which data (e.g., PUSCH) to be actually transmitted is mapped, for example, based on a coding rate of the data to be actually transmitted.

For example, terminal 200 determines the number of symbols that satisfy a coding rate based on a Configured grant configuration (hereinafter, referred to as "required number of symbols"). The required number of symbols may be determined, for example, from the following Equation 1:

(Equation 1)

(Required number of symbols)=[{(Number of transmission CBs)/(Number of configured CBs)}* (Number of configured symbols)]      [1].

The right side of Equation 1 represents a ceil function that returns the smallest integer equal to or greater than "{(Number of transmission CBs)/(Number of configured CBs)} *(Number of configured symbols)". Herein, the "number of configured CBs" and the "number of configured symbols" represent, for example, values configured for terminal 200 by RRC signaling or a PDCCH (e.g., DCI) as the Configured grant configuration. In addition, the "number of transmission CBs" represents the number of CBs actually transmitted from terminal 200, and is a value indicated from terminal 200 to base station 100 by Configured grant-UCI (CG-UCI), for example.

The CG-UCI is, for example, control information (e.g., HARQ process ID) for PUSCH transmission of the NR-U configured grant, and is transmitted with a PUSCH from terminal 200 to base station 100.

By way of example, in a case where the "number of configured CBs" is 4 CBs, the "number of transmission CBs" is 2 CBs, and the "number of configured symbols" is 14 symbols in Equation 1 (see, for example, FIG. 7), the "required number of symbols" for the PUSCH transmission is 7 symbols. Note that the parameters configured to Equation 1 are not limited to these.

Further, the position of the changed ending symbol may be configured to, for example, either a symbol located prior to a starting symbol candidate configured for terminal 200 by n symbols (n represents an integer of 1 or more) or an ending symbol configured by the Configured grant (e.g., configured ending symbol).

Herein, "n" may be determined according to a gap for LBT configured before the starting symbol candidate, for example. The shorter the gap for LBT is, the smaller the value of n may be configured, for example. In a case where the transmission by terminal 200 is followed by transmission by another terminal, it is assumed that the transmission by another terminal will start from a starting symbol. Terminal 200 can thus lower a coding rate by continuing the transmission immediately before the starting symbol, and base station 100 is more likely to successfully receive the PUSCH accordingly. Thus, n is preferably 1 when no gap is required.

Terminal 200 may determine the position of the ending symbol, for example, based on the starting symbol candidates (symbols where terminal 200 starts PUSCH transmission) determined according to the LBT result so as to satisfy the required number of symbols represented in Equation 1 and to use fewer (e.g., fewest) symbols for the PUSCH transmission, for example. This allows terminal 200 to transmit the PUSCH while reducing the time resource allocated for the PUSCH and satisfying the coding rate of the Configured grant configuration.

In addition, configuring the position of the changed ending symbol prior to a starting symbol candidate, for example, allows another terminal 200 to transmit a PUSCH from the starting symbol candidate. This improves resource utilization efficiency.

In Determination Method 1, terminal 200 does not configure the position of the ending symbol to the position after the required number of symbols calculated by Equation 1 from the starting symbol of a PUSCH (i.e., starting symbol+ the required number of symbols), but configures the position of the ending symbol to a symbol located prior to another starting symbol candidate by n symbols. For example, even when "starting symbol+the number of symbols" corresponds to a position before the symbol located prior to the next starting symbol candidate by n symbols, terminal 200 configures the ending symbol to the symbol located prior to the next starting symbol candidate by n symbols.

Here, another terminal starts the PUSCH transmission from the position of a starting symbol candidate. Thus, even when terminal 200 stops the PUSCH transmission before the symbol prior to the starting symbol candidate by n symbols, the remaining resource cannot be used by another terminal, and this does not contribute to better resource utilization efficiency. Terminal 200 can lower the coding rate of the PUSCH by continuing the PUSCH transmission until the symbol located prior to the starting symbol candidate by n symbols, and base station 100 is more likely to succeed in receiving the PUSCH accordingly. This increases the probability of successful PUSCH transmission without reducing the resource utilization efficiency.

Note that, in a case where the required number of symbols is not satisfied by the PUSCH transmission until the ending symbol configured for terminal 200 (e.g., configured ending symbol), terminal 200 may configure the actual ending symbol to the configured ending symbol.

Further, terminal 200 may configure the position of the ending symbol to a symbol corresponding to (starting symbol+the required number of symbols).

Base station 100 determines the ending symbol of a PUSCH transmitted by terminal 200 by the same processing as terminal 200, and receives the PUSCH based on the determined ending symbol.

As described above, in Determination Method 1, the ending symbol of a PUSCH is uniquely determined based on known information (i.e., shared information) between base station 100 and terminal 200, such as the positions of starting symbol candidates and the number of transmission CBs. This allows base station 100 and terminal 200 to change the position of the ending symbol without additional signaling.

Further. Determination Method 1 increases the resource available to another terminal without affecting the data transmission by terminal 200 by reducing the number of symbols used for the PUSCH transmission while maintaining the coding rate of the data configured by base station 100 (in other words, the coding rate intended by base station 100), thereby improving the resource utilization efficiency.

Note that the determination of the ending symbol of a PUSCH is not limited to the method based on Equation 1 in Determination Method 1-1, and for example, the number of transmission CBs (i.e., the required number of symbols) may be determined by terminal 200 counting the number of NACKs for the PUSCH.

<Determination Method 2>

In Determination Method 2, terminal 200 determines an ending symbol (i.e., changed ending symbol) of a time resource to which data (e.g., PUSCH) to be actually transmitted is mapped, for example, based on a coding rate according to the data to be actually transmitted and a signal multiplexed to the PUSCH (e.g., UCI or additional Demodulation Reference Signal (DMRS)).

The coding rate of transmission data (PUSCH and multiplexed signal) of terminal 200 is increased, for example, when the size of a resource used for the signal multiplexed to the PUSCH is not changed although the number of PUSCH symbols is decreased by changing the ending symbol as in Determination Method 1. Thus, Determination Method 2 takes into consideration the signal multiplexed to a PUSCH, and lowers the coding rate compared to Determination Method 1.

For example, terminal 200 determines the number of symbols that satisfy a coding rate based on a Configured grant configuration ("required number of symbols"). The required number of symbols may be determined, for example, from the following Equation 2:

(Equation 2)

(Required number of symbols)=[{(Number of transmission CBs)/(Number of configured CBs)}* (Number of configured symbols)+(Number of multiplexed REs)/(Number of allocated subcarriers)]    [2].

The right side of Equation 2 represents a ceil function that returns the smallest integer equal to or greater than "((Number of transmission CBs)/(Number of configured CBs))* (Number of configured symbols)+(Number of multiplexed REs)/(Number of allocated subcarriers)". Herein, the "number of multiplexed REs" represents the number of Resource elements (REs) for the signal additionally multiplexed to a PUSCH. Further, the "number of allocated subcarriers" is obtained from the number of Resource Blocks (RBs) allocated for the PUSCH transmission and the number of subcarriers per RB. Thus, "(Number of multiplexed REs)/ (Number of allocated subcarriers)" in Equation 2 represents the number of symbols (decimal) used for transmitting the signal multiplexed to the PUSCH.

Note that the "number of multiplexed REs" need not include the number of REs for HARQ-ACK of equal to or less than 2 bits. The HARQ-ACK of 2 bits or less is multiplexed by puncturing so as not to affect rate matching of data. The operation of the HARQ-ACK of 2 bits or less not to affect the determination of the ending symbol in Determination Method 2 prevents an error in receiving a PUSCH in base station 100 due to an error in detecting a PDCCH in terminal 200 (for example, a state where the PUSCH is not properly received due to a difference in recognition of the rate matching between terminal 200 and base station 100).

Further, the "number of multiplexed REs" need not include the number of REs for CG-UCI. In the Configured grant transmission, the CG-UCI is transmitted being multiplexed to PUSCH, and thus the operation without including the number of REs for the CG-UCI in the "number of multiplexed REs" is possible by configuring the coding rate of the data while taking the multiplexing of the CG-UCI into consideration in advance in base station 100.

By way of example, in Equation 2, in a case where the "number of transmission CBs" is 2 CBs, the "number of configured CBs" is 4 CBs, the "number of configured symbols" is 14 symbols, the "number of multiplexed REs" is 636 REs, and the "number of allocated subcarriers" is 1272 subcarriers, the "number of required symbols" for the transmission of a PUSCH (and multiplexed signal) is 8 symbols. Note that the parameters configured to Equation 2 are not limited to these.

Note that, in Determination Method 2, the position of the changed ending symbol may be configured to, for example, either a symbol located prior to a starting symbol candidate configured for terminal 200 by n symbols (n represents an integer of 1 or more) or a configured ending symbol, as in Determination Method 1.

As described above, Determination Method 2 increases the resource available to another terminal, considering the signal multiplexed to a PUSCH, without affecting the data transmission by terminal 200 by reducing the number of symbols used for the PUSCH transmission while maintaining the coding rate of the data configured by base station 100 (in other words, the coding rate of the data intended by base station 100), thereby improving resource utilization efficiency.

<Determination Method 3>

In Determination Method 3, terminal 200 determines whether to change an ending symbol of a PUSCH based on, for example, the presence or absence of a signal (e.g., UCI or additional DMRS) additionally multiplexed to the PUSCH.

For example, terminal 200 may change (e.g., move forward) the ending symbol of the PUSCH when no signal is multiplexed to the PUSCH. In this case, Determination Method 1 may be used as the method of determining the ending symbol, for example.

When there is a signal multiplexed to the PUSCH, in contrast, terminal 200 configures the ending symbol configured by base station 100 without changing (e.g., moving forward) the ending symbol of the PUSCH.

For example, HARQ-ACK of 2 bits or less is multiplexed by puncturing the data (e.g., PUSCH). It is thus assumed that the fewer the number of data symbols is, the greater effect the multiplexing of a signal such as the HARQ-ACK (i.e., puncture) gives on the data. With this regard, in Determination Method 3, terminal 200 does not move forward (i.e., does not change) the ending symbol of the PUSCH when there is a signal multiplexed to the PUSCH. This protects the data transmission of the PUSCH.

Note that, in a case where there is a sufficient number of data symbols (for example, the number of symbols is equal to or greater than a threshold), terminal 200 may move forward the ending symbol of the PUSCH even when there is a signal multiplexed to the PUSCH.

As described above, Determination Method 3 increases the resource available to another terminal, considering the signal multiplexed to the PUSCH, without affecting the data transmission by terminal 200 by reducing the number of symbols used for the PUSCH transmission while maintaining the coding rate of the data configured by base station 100 (in other words, the coding rate of the data intended by base station 100), thereby improving resource utilization efficiency.

Further, in Determination Method 3, the number of symbols used for PUSCH transmission is not reduced when a signal multiplexed to the PUSCH (i.e., puncture by the signal) is likely to affect the PUSCH transmission. This allows terminal 200 to appropriately perform the PUSCH transmission.

Determination Methods 1 to 3 have been described, thus far.

As described above, in the present embodiment, base station 100 and terminal 200 configure the ending symbol of a time resource configured for a PUSCH in accordance with at least one of the number of CBs (e.g., data size) and retransmission of the PUSCH, and transmit and receive the PUSCH based on the configured ending symbol.

For example, terminal 200 changes the ending symbol (i.e., end position) of the time resource configured for the PUSCH to be transmitted when the number of CBs (e.g., data size) of the PUSCH is less than the number of configured CBs (see, for example, FIG. 7) or when the PUSCH is retransmitted (see, for example, FIG. 7), and transmits the PUSCH based on the changed ending symbol.

Further, base station 100 changes the ending symbol (i.e., end position) of the time resource configured for the PUSCH to be transmitted by terminal 200 when the number of CBs (data size) of the PUSCH is less than the number of CBs configured for terminal 200 (see, for example, FIG. 7) or w % ben the PUSCH is retransmitted (see, for example, FIG. 7), and receives the PUSCH based on the changed ending symbol.

This allows terminal 200 to transmit the PUSCH based on, for example, a resource corresponding to a resource configured in a Configured grant configuration (in other words, resource expected by base station 100). In addition, the prevention of overuse of the resource by terminal 200 enables another terminal to use the remaining resource (e.g., resource after the changed ending symbol), thereby improving the resource utilization efficiency.

Thus, the present embodiment makes it possible to improve the utilization efficiency of the uplink resource in the unlicensed frequency band, for example.

Note that the description has been given of the case of using the number of CBs for the method of determining the ending symbol of a PUSCH in the present embodiment, but it is not limited to the case. For example, the number of CBGs may be used instead of the number of CBs.

Additionally, base station 100 may explicitly indicate the ending symbol position of a PUSCH to terminal 200 in the present embodiment. DFI may be used for the explicit indication, for example. Further, base station 100 may indicate to terminal 200 that the ending symbol of a PUSCH is not changed, for example, when multiplexing between terminal 200 and another terminal is not necessary.

Furthermore, base station 100 may indicate to terminal 200 that the multiplexing between terminal 200 and another terminal is not necessary in the present embodiment, for example. In this case, terminal 200 does not change the ending symbol of a PUSCH.

Embodiment 2

[Time Offset]

It has been discussed for the NR-U Configured grant to employ a mechanism for avoiding a transmission collision between terminals using an offset (time offset) that has finer granularity than the symbol length for transmission start timings in uplink.

In the NR-U configured grant, it is assumed that the same physical resource is allocated to a plurality of terminals, for example. When the terminals using the same physical resource start transmission at the same timing, the transmissions may collide with each other and a base station possibly fails to receive the signals properly in some cases.

In this regard, each terminal, for example, waits for an offset (time offset), which has finer granularity than the symbol length, in a starting symbol before starting the transmission.

The time offset value is configured by a higher layer, for example, for each terminal. Note that, when a single terminal has a plurality of configured grant configurations, different time offset values may be respectively configured for the Configured grant configurations for the same terminal. Additionally, a method of selecting the time offset value may be in the following way, for example; a plurality of candidates for the time offset value are configured, and the terminal randomly selects from among the plurality of candidates.

When a certain terminal starts transmission first, another terminal cannot transmit; that is, a terminal with a shorter time offset value (in other words, terminal that can start transmission earlier) has higher priority for uplink transmission. Thus, it is possible to avoid the collision of transmissions between terminals.

Figure 8:
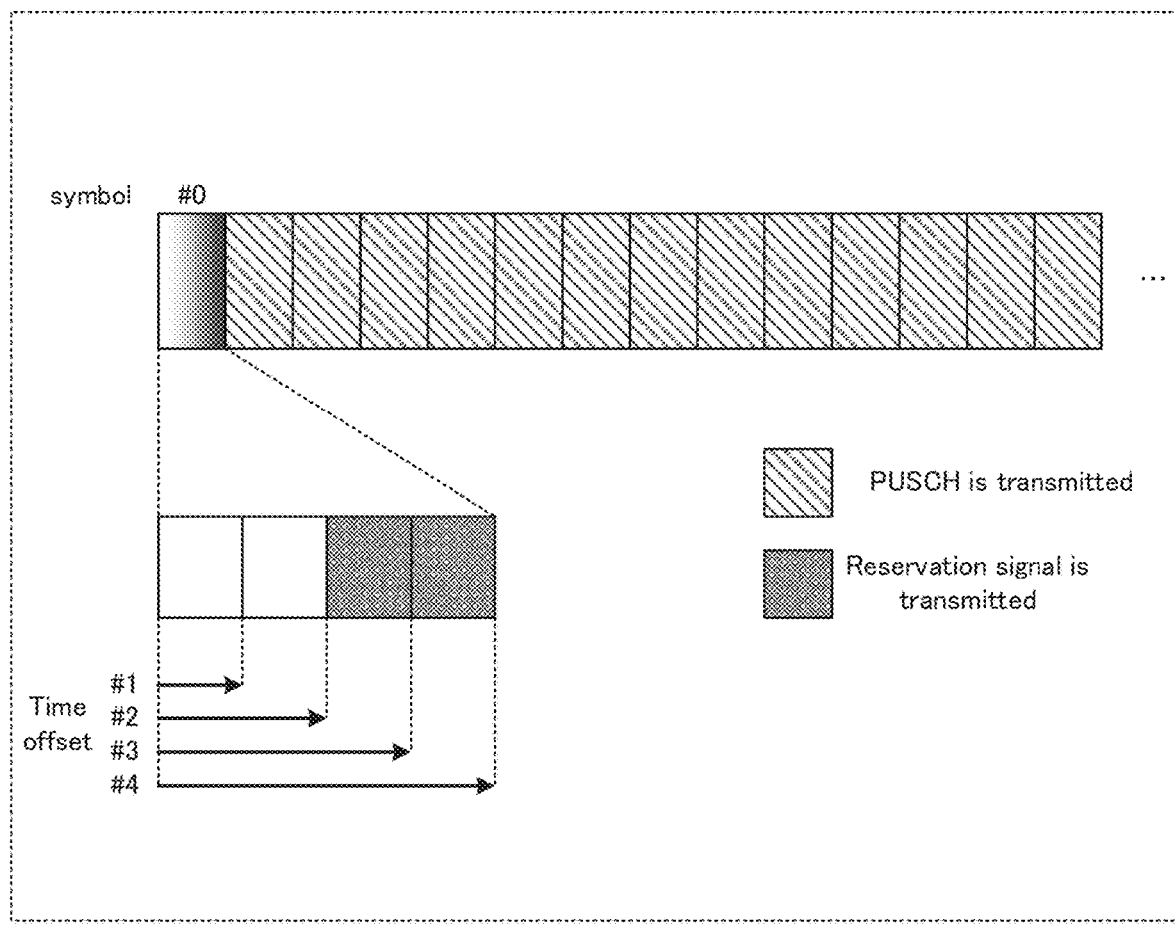
FIG. 8 illustrates an exemplary configuration of time offsets.

FIG. 8 illustrates an exemplary configuration of the time offsets. For example, each symbol (symbol #0 in FIG. 8) is configured with time offsets #1 to #4 having finer granularity than the symbol length. In FIG. 8, when a terminal configured with (or that has selected) time offset #2 starts transmission, for example, a terminal configured with time offset #3 or #4, which is longer than time offset #2, cannot transmit a PUSCH. At this time, the terminal configured with time offset #3 or #4 fails in LBT due to a signal (e.g., reservation signal) transmitted by the terminal configured with time offset #2, for example.

Herein, the resource size used for PUSCH transmission is different between initial transmission (e.g., transmission including all CBs) and retransmission (e.g., transmission including some CBs or may be transmission with a coding rate higher than that of the initial transmission when combining incremental redundancy (IR)).

In this regard, a terminal configures the time offset value to be different between the initial transmission and the retransmission in the present embodiment. This enables time division multiplexing (TDM) of transmissions of a plurality of terminals using a free resource, thereby improving resource utilization efficiency.

The base station and the terminal according to the present embodiment have the same basic configurations as those of base station 100 and terminal 200 according to Embodiment 1, and thus FIGS. 3 and 4 are used for the description. Descriptions will be given below of operations of base station 100 and terminal 200 according to the present embodiment that are different from the operations in Embodiment 1.

[Configuration of Base Station]

Base station 100 determines a time offset value for each terminal 200 in scheduler 106, and indicates signaling information including the determined time offset value to terminal 200, for example, via data generator 107. Note that base station 100 may indicate, to terminal 200, a single candidate from among a plurality of candidates for the time offset shared between base station 100 and terminal 200, for example, or may configure so that terminal 200 selects a single candidate.

[Configuration of Terminal]

In terminal 200, transmission controller 206 determines whether transmission can be performed according to the configured time offset, based on a configured grant configuration inputted from control information holder 205 and the channel state (e.g., state of busy or idle) inputted from channel state estimator 202. When determining that the transmission is possible, transmission controller 206 outputs a data generation indication to data generator 207, and outputs resource information (e.g., including shifting the transmission timing by the time offset) to encoder/modulator 209. When determining that the transmission is not possible, in contrast, transmission controller 206 does not perform the data transmission processing.

When the resource information inputted from transmission controller 206 indicates that the time offset causes signal transmission to be shorter than one symbol in a certain symbol, encoder/modulator 209 generates a signal (also referred to as a Reservation signal) for securing a channel in the symbol, and outputs the signal to transmitter 210.

[Time Offset Determination Methods]

Next, methods of determining the time offset in terminal 200 (e.g., transmission controller 206) will be described. Note that base station 100 (reception controller 104) also controls reception based on the determination methods to be described later.

<Determination Method 1>

In Determination Method 1, the time offset for retransmission is shorter than that for initial transmission.

According to Determination Method 1, priority of the retransmission is configured to be higher than that of the initial transmission. This allows terminal 200 to complete the retransmission faster, thus reducing a delay of PUSCH transmission.

Figure 9:
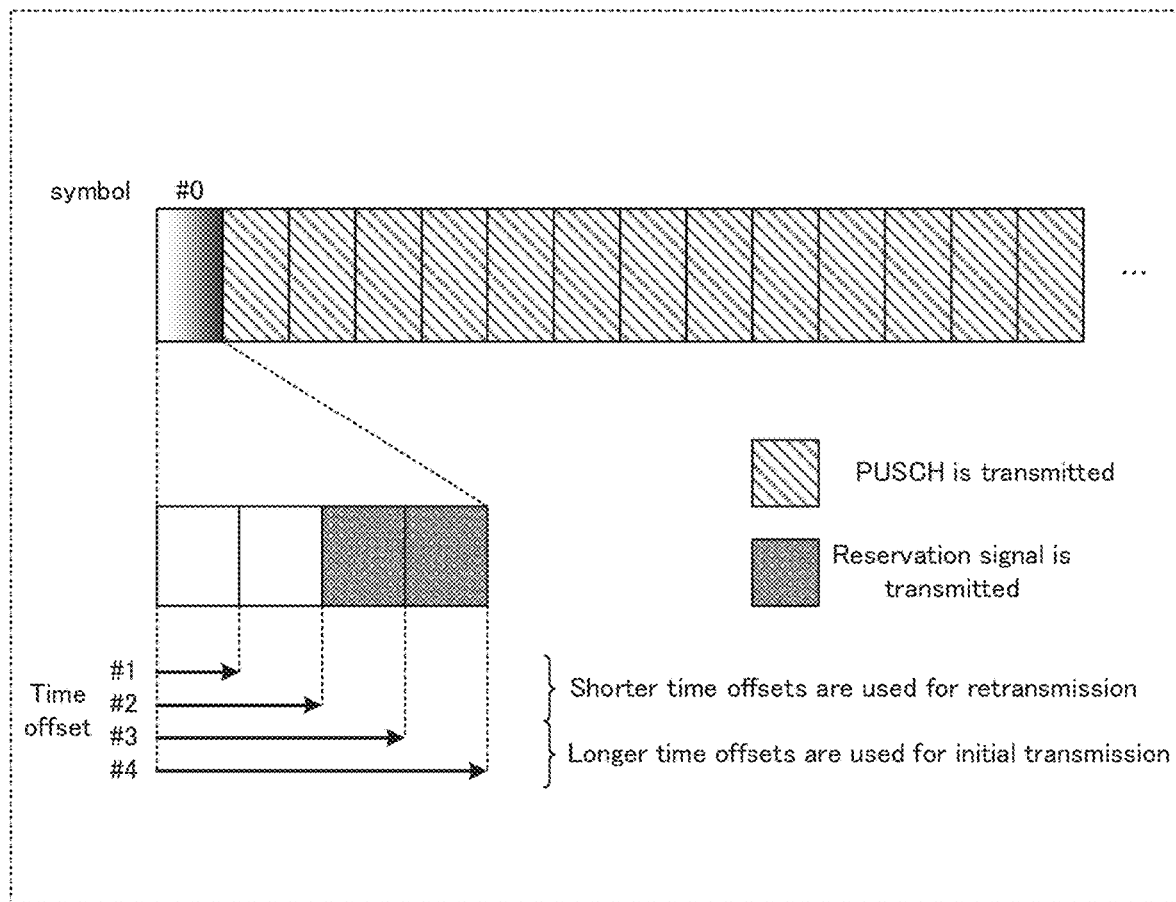
FIG. 9 illustrates an exemplary configuration of time offsets according to Determination Method 1 in Embodiment 2.

FIG. 9 illustrates exemplary assignment of time offsets in Determination Method 1. In FIG. 9, either of time offset #1 or #2 is assigned for the retransmission, and either of time offset #3 or #4 is assigned for the initial transmission, for example, in configured grant transmission by terminal 200. This allows, in FIG. 9, a terminal performing the retransmission of a PUSCH to start the transmission prior to a terminal performing the initial transmission of a PUSCH, and to preferentially transmit (i.e., retransmit) the PUSCH.

As described above, Determination Method 1 enables multiplexing of the transmission signals of a plurality of terminals so that the retransmissions are performed preferentially over the initial transmissions in the plurality of terminals, thereby reducing the transmission delay of the PUSCH and improving resource utilization efficiency.

<Determination Method 2>

In Determination Method 2, the time offset for initial transmission is shorter than that for retransmission.

Figure 10:
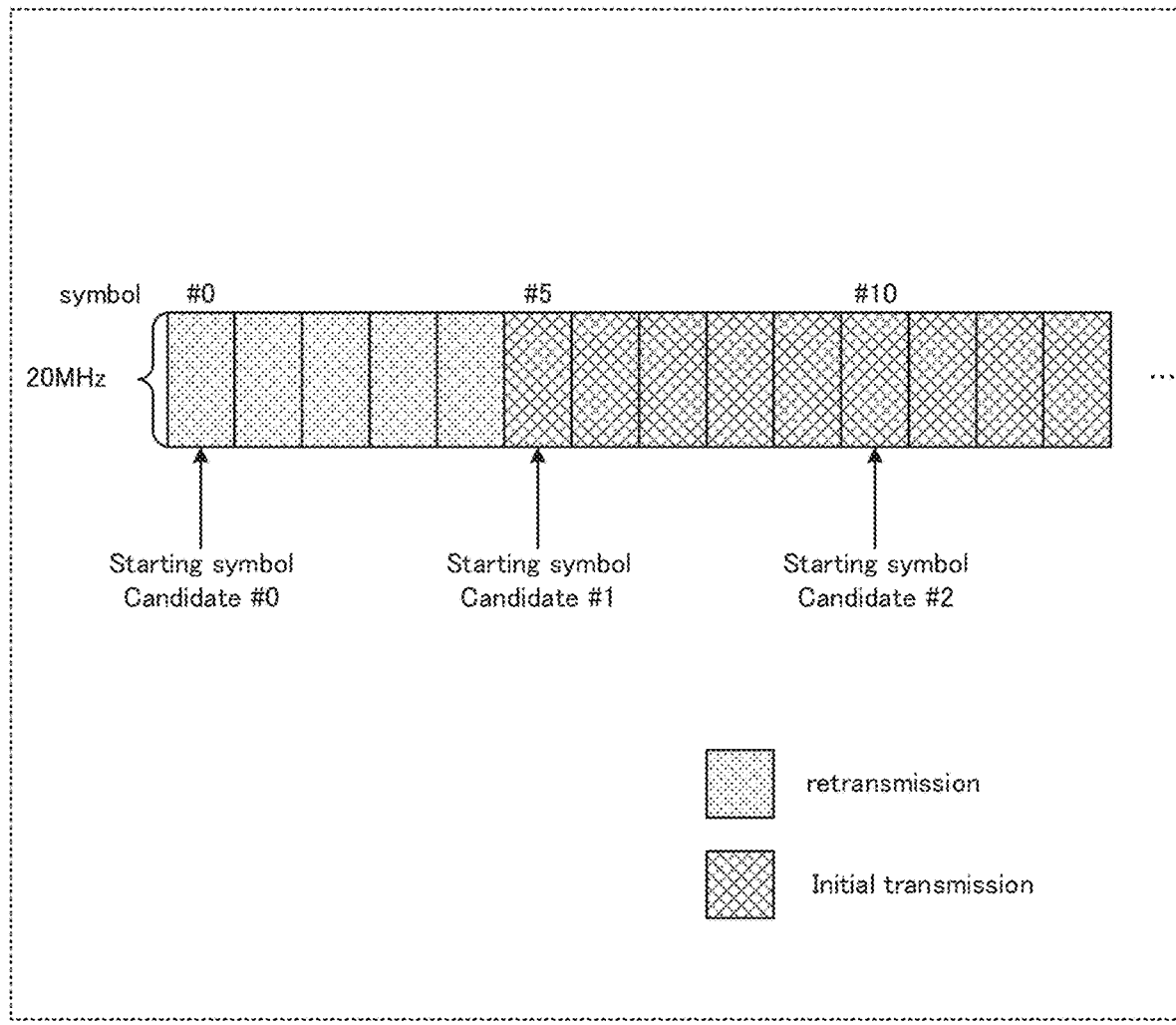
FIG. 10 illustrates an exemplary configuration of time offsets.

In a case where the initial transmission and the retransmission coexist, it is assumed that the retransmission is transmitted and the initial transmission is subsequently transmitted (in other words, the retransmission is prioritized) as illustrated in FIG. 10. In such a case, it is assumed that symbols for an initially transmitted PUSCH are likely to be punctured by symbols for a retransmitted PUSCH, base station 100 is likely to fail to receive the initially transmitted PUSCH, and this causes more retransmissions.

With this regard, in Determination Method 2, the time offset for the initial transmission is configured to be shorter than the time offset for the retransmission in a case where the transmission delay causes no problem. This prioritizes the initial transmission over the retransmission, thereby decreasing the probability of the symbols for the initially transmitted PUSCH being punctured by another signal, for example, and causing less retransmissions.

As described above, Determination Method 2 makes it possible to multiplex the transmission signals from a plurality of terminals while preventing the case where the initially transmitted data is punctured by the retransmitted data in the plurality of terminals, thereby improving resource utilization efficiency.

<Determination Method 3>

In Determination Method 3, the time offset is determined according to starting symbol candidates configured in a time resource to which a PUSCH is mapped.

Figure 11:
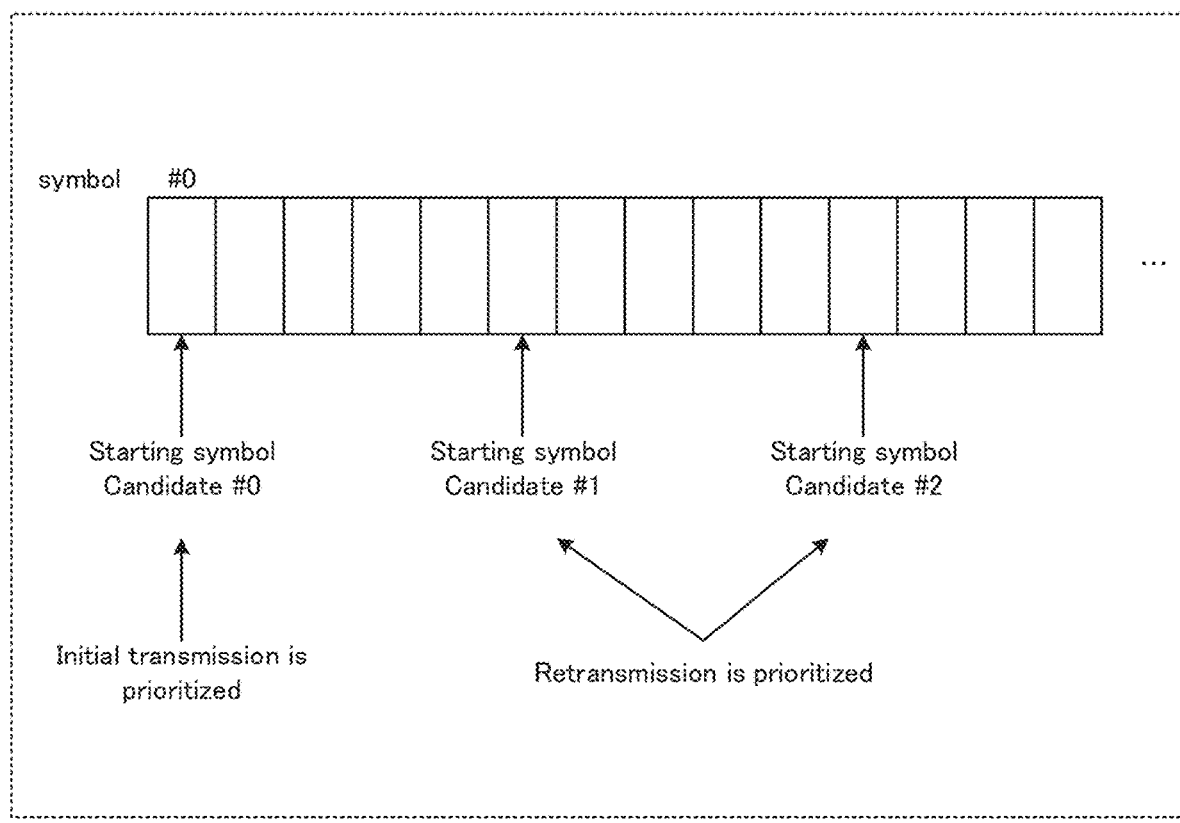
FIG. 11 illustrates an exemplary configuration of time offsets according to Determination Method 3 in Embodiment 2.

As illustrated in FIG. 11, the time offset for initial transmission is configured to be shorter than the time offset for retransmission in the first starting symbol candidate #0 in the slot, for example. In other words, the initial transmission is prioritized over the retransmission in the first starting symbol candidate #0 in the slot.

Meanwhile, the time offset for retransmission is configured to be shorter than the time offset for initial transmission, for example, in starting symbol candidates #1 and #2 other than the first starting symbol candidate #0 in the slot, as illustrated in FIG. 11. In other words, the retransmission is prioritized over the initial transmission in starting symbol candidates #1 and #2 in the slot.

Herein, in order for base station 100 to decode the initially transmitted PUSCH properly, all symbols configured for terminal 200 are assumed to be used for the transmission. When the time offset for the initial transmission is shorter than the time offset for the retransmission at all timings (i.e., starting symbol candidates), however, the retransmission obtains fewer transmission occasions and the transmission delay possibly increases.

Thus, the time offset for the initial transmission is configured to be shorter than the time offset for the retransmission in the first starting symbol candidate in Determination Method 3; accordingly, terminal 200 can transmit a PUSCH composed of all the configured CBs, for example, from the first starting symbol at the time of the initial transmission of the PUSCH. This makes base station 100 highly likely to decode both the initially transmitted PUSCH properly.

In addition, the time offset for the retransmission is configured to be shorter than the time offset for the initial transmission in the starting symbol candidates other than the minimum starting symbol candidate in Determination Method 3, and this allows terminal 200 to preferentially perform the retransmission of a PUSCH. Further, the number of CBs of the PUSCH to be retransmitted (the number of transmission CBs) is more likely to be less than the number of CBs configured for terminal 200 (the number of configured CBs), and thus base station 100 is highly likely to decode both the retransmitted PUSCH properly even when the retransmission is started from a starting symbol candidate configured in the middle of the slot.

As described above, Determination Method 3 makes it possible to multiplex the transmission signals of a plurality of terminals so that base station 100 is highly likely to succeed in decoding both the initially transmitted and retransmitted PUSCHs from the plurality of terminals, thereby improving resource utilization efficiency.

<Determination Method 4>

In Determination Method 4, the time offset for each Starting symbol candidate is determined by a base station according to the status of configured grant transmission.

The priority of transmission (e.g., initial transmission and retransmission) for each starting symbol candidate may vary depending on the status of the configured grant transmission (i.e., status of scheduling by base station 100). The time offset for each starting symbol candidate is thus changed by signaling from base station 100 to terminal 200.

The status of the Configured grant transmission may be represented by, for example, the number of terminals using the same resource.

For example, the more terminals that use the same resource, the more likely it is that the resource is used by one of the terminals (in other words, the more frequently the resource is used). When one of the initial transmission and the retransmission is prioritized in this situation, the other transmission is not performed while the prioritized transmission is performed, thereby reducing transmission efficiency. In a case where the initial transmission is prioritized over the retransmission, for example, the retransmission cannot be performed until all the terminals complete the initial transmissions (in other words, until all HARQ processes are used), and the transmission delay increases greatly. In this case, occurrence of the initial transmission and the retransmission is balanced by, for example, configuring the time offset prioritizing the retransmission to a certain extent in accordance with a target Block Error Rate (BLER), so that the transmission efficiency is improved.

Conversely, the fewer terminals that use the same resource, the less frequently it is the resource is used. The initial transmission and the retransmission are less likely to coexist in this situation, and the configuration of the time offset to prioritize the initial transmission, for example, is unlikely to cause the transmission delay as described above.

As described above, Determination Method 4 enables base station 100 to configure the time offset according to the status of the configured grant transmission, thereby improving resource utilization efficiency.

<Determination Method 5>

In Determination Method 5, the Time offset is determined according to a transmission timing of a PUSCH.

In a case where the initial transmission and the retransmission coexist at a single configured grant transmission timing (e.g., a slot, or also referred to as a transmission occasion), symbols for the initially transmitted PUSCH are punctured by symbols for the retransmitted PUSCH.

Figure 12:
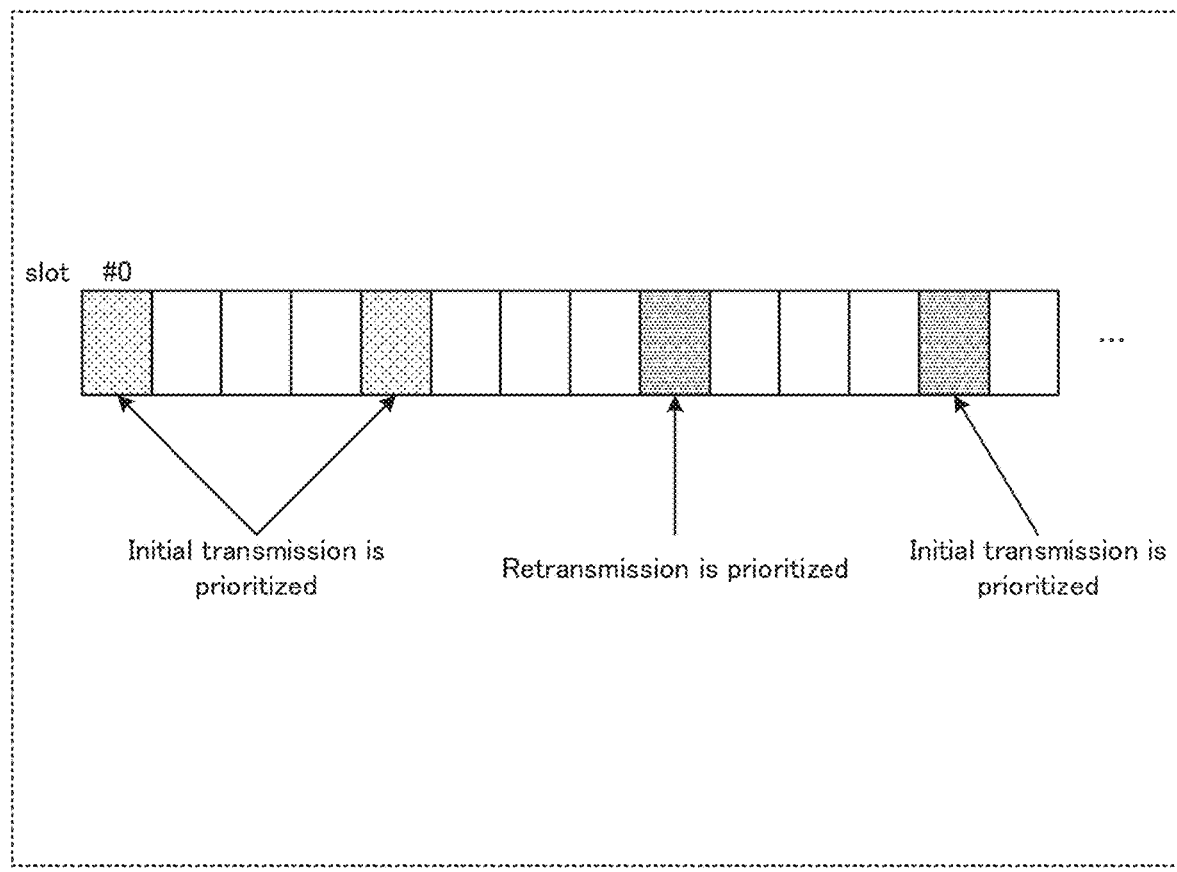
FIG. 12 illustrates an exemplary configuration of time offsets according to Determination Method 5 in Embodiment 2.

With this regard, the time offsets for the initial transmission and the retransmission are changed according to the transmission timing (e.g., different slots) in Determination Method 5. In FIG. 12, the initial transmission is prioritized over the retransmission in some slots whereas the retransmission is prioritized over the initial transmission in other slots, for example. In the slots where the initial transmission is prioritized over the retransmission, for example, the time offset for the initial transmission in each starting symbol in the slots is configured to be shorter than the time offset for the retransmission. Meanwhile, in the slots where the retransmission is prioritized over the initial transmission, for example, the time offset for the retransmission in each starting symbol in the slots is configured to be shorter than the time offset for the initial transmission.

Terminal 200, for example, only needs to transmit a PUSCH for initial transmission in the slot where the initial transmission is prioritized, and transmit a PUSCH for retransmission in the slot where the retransmission is prioritized. This reduces the probability of the symbols for the initially transmitted PUSCH being punctured by the symbols for the retransmitted PUSCH, for example, even when the initial transmission and the retransmission coexist. Further, the PUSCH for the retransmission is likely to be transmitted using some of a resource (some symbols) in a slot, so that retransmission data of a plurality of terminals is easier to be multiplexed in the slots where the retransmission is prioritized.

Note that the time offset may be configured to be different between the initial transmission and the retransmission depending on a configured grant configuration.

As described above, the transmission timings are configured to be different between the initial transmission and the retransmission in Determination Method 5, thereby reducing collisions between the initial transmissions and the retransmissions, and improving resource utilization efficiency.

<Determination Method 6>

In Determination Method 6, the time offset to be used for the retransmission is changed according to DFI.

For example, the necessity of multiplexing transmission signals among terminals 200 depends on the communication status (e.g., the number of terminals that need to perform retransmission).

The DFI may include time offset information because HARQ-ACK for PUSCH transmission is indicated by the DFI. This allows base station 100 to dynamically change the time offset for the retransmission and control the multiplexing among terminals.

As described above, Determination Method 6 makes it possible to multiplex the transmissions of a plurality of terminals while dynamically configuring the priority of the initial transmission and the retransmission according to the communication status, thereby effectively utilizing a radio resource.

Determination Methods 1 to 6 have been described, thus far.

As described above, terminal 200 configures the time offsets to be different between the initial transmission and the retransmission in the present embodiment. This improves the efficiency of multiplexing signals transmitted from a plurality of terminals, and also improves the resource utilization efficiency.

Note that, in the present embodiment, a description has been given of the case of configuring the time offset to be different between the initial transmission and the retransmission, but the present embodiment is not limited to this. For example, terminal 200 may configure the time offset to be different between a case where a PUSCH is assigned to all of CBs, i.e., a time resource, (or CBs equal to or more than a threshold) configured for terminal 200 (e.g., including initial transmission) and a case where a PUSCH is assigned to some of CBs, i.e., a time resource, (or CBs less than the threshold) configured for terminal 200 (e.g., including retransmission).

In addition, the configuration of the time offset according to the present embodiment may be applied to, for example, a free resource resulting from the operation of Embodiment 1 (e.g., changing (moving forward) the ending symbol of PUSCH).

Alternatively, the configuration of the time offset according to the present embodiment may be applied, for example, to a free resource among the configured grant resource configured for terminal 200, apart from the operation of Embodiment 1.

Further, terminal 200 may be configured with a plurality of candidates for the time offset, and may randomly select a time offset from among the plurality of candidates, or may select according to certain criteria. In this case, the time offset values selectable by terminal 200 only need to be configured so as to have a relation where the value for initial transmission or retransmission is greater or smaller than the value for the other, for example.

Exemplary embodiments of the present disclosure have been described, thus far.

Other Embodiments

Each of the above embodiments are applicable to both type 1 PUSCH transmission (also referred to as slot based transmission) and type 2 PUSCH (also referred to as mini-slot based transmission).

In the above embodiments, the higher layer signaling is assumed to be RRC signaling, but may be replaced with Medium Access Control (MAC) signaling or an indication by DCI, which is physical layer signaling. The MAC signaling and the physical layer signaling increase the frequency of the change compared to the RRC signaling.

In the above embodiments, a downlink control channel for transmitting a control signal is not limited to a PDCCH, and may also be a control channel of another name. Additionally, an uplink data channel for transmitting UL data is not limited to a PUSCH, and may be a data channel of another name.

In the above embodiments, the time resource for the Configured grant transmission is not limited to be slot based or symbol based, and may be based on other time resources (e.g., a subframe, a frame, a mini slot, etc.).

In the above embodiments, terminal 200 may transmit data of a different HARQ process after the transmission by terminal 200, instead of another terminal transmitting from a starting symbol.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers. RF modulators/demodulators and the like, and one or more antennas. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A terminal according to an embodiment of the present disclosure includes: control circuitry, which, in operation, configures a first end position of a time resource configured for uplink data to a second end position in accordance with at least one of a data size and/or retransmission of the uplink data; and transmission circuitry, which, in operation, transmits the uplink data based on the second end position.

In an embodiment of the present disclosure, the control circuitry configures the first end position to the second end position in at least one of a case where the data size of the uplink data to be transmitted is smaller than the data size that has been configured and/or a case where the uplink data is retransmitted.

In an embodiment of the present disclosure, the time resource is a resource in units of symbols, and the second end position corresponds to either one of a symbol located prior to at least one of transmission starting symbol candidates by n symbols, wherein n is an integer of 1 or more, or a symbol corresponding to the first end position, the transmission starting symbol candidates being configured for the uplink data.

In an embodiment of the present disclosure, a symbol corresponding to the second end position is determined based on a coding rate of the uplink data to be transmitted.

In an embodiment of the present disclosure, a symbol corresponding to the second end position is determined based on a coding rate according to the uplink data to be transmitted and a signal multiplexed to the uplink data.

In an embodiment of the present disclosure, the control circuitry determines whether to change the first end position to the second end position based on presence or absence of a signal multiplexed to the uplink data.

In an embodiment of the present disclosure, the control circuitry configures an offset for a transmission start timing in uplink to be different between a first case where the data size of the uplink data to be transmitted is the data size that has been configured and a second case where the data size of the uplink data to be transmitted is smaller than the data size that has been configured.

In an embodiment of the present disclosure, the offset in the second case is shorter than the offset in the first case.

In an embodiment of the present disclosure, the offset in the first case is shorter than the offset in the second case.

In an embodiment of the present disclosure, the offset is determined in accordance with at least one of transmission start position candidates for the uplink data in the time resource.

In an embodiment of the present disclosure, the offset in the first case is shorter than the offset in the second case in a first one of the transmission start position candidates in the configured time resource, and the offset in the second case is shorter than the offset in the first case in another one or more of the transmission start position candidates other than the first one of the transmission start position candidates in the configured time resource.

In an embodiment of the present disclosure, the offset in each of the transmission start position candidates is determined in accordance with uplink usage.

In an embodiment of the present disclosure, the offset is determined in accordance with a transmission timing of the uplink data.

In an embodiment of the present disclosure, the offset is determined in accordance with a response signal for the uplink data.

In an embodiment of the present disclosure, the first case is a case of initial transmission of the uplink data and the second case is a case of retransmission of the uplink data.

A base station according to an embodiment of the present disclosure includes: control circuitry, which, in operation, configures a first end position of a time resource configured for uplink data to a second end position in accordance with at least one of a data size and/or retransmission of the uplink data; and reception circuitry, which, in operation, receives the uplink data based on the second end position.

A transmission method according to an embodiment of the present disclosure includes: configuring, by a terminal, a first end position of a time resource configured for uplink data to a second end position in accordance with at least one of a data size and/or retransmission of the uplink data; and transmitting, by the terminal, the uplink data based on the second end position.

A reception method according to an embodiment of the present disclosure includes: configuring a first end position of a time resource configured for uplink data to a second end position in accordance with at least one of a data size and/or retransmission of the uplink data; and receiving the uplink data based on the second end position.

The disclosure of Japanese Patent Application No. 2019-064579, filed on Mar. 28, 2019, including the specification, drawings and abstract, is incorporated herein by reference in its entirety.

INDUSTRIAL APPLICABILITY

An exemplary embodiment of the present disclosure is useful for mobile communication systems.

REFERENCE SIGNS LIST

100 Base station
101, 201 Receiver
102 UCI demodulator/decoder
103, 205 Control information holder
104 Reception controller
105 Data demodulator/decoder
106 Scheduler
107 Data generator
108 DFI generator
109, 209 Encoder/modulator
110, 210 Transmitter
200 Terminal
202 Channel state estimator
203 Demodulator/decoder
204 Retransmission determiner
206 Transmission controller
208 UCI generator

The invention claimed is:

1. A terminal, comprising:

control circuitry, which, in operation, sets a first time offset in a first transmission of two transmissions, and changes to a second time offset for a second transmission of the two transmissions, the first transmission being prior to the second transmission, each of the first time offset and the second time offset being less than a length of a symbol; and transmission circuitry, which, in operation, performs the second transmission based on the second time offset.

2. The terminal according to claim 1, wherein a data size of the second transmission is smaller than a data size of the first transmission.

3. The terminal according to claim 1, wherein the second time offset is shorter than the first time offset.

4. The terminal according to claim 1, wherein the first time offset is shorter than the second time offset.

5. The terminal according to claim 1, wherein the first time offset is indicated from a base station.

6. The terminal according to claim 1, wherein the first time offset and the second time offset are determined in accordance with uplink usage.

7. The terminal according to claim 1, wherein the first transmission is an initial transmission and the second transmission is a retransmission.

8. The terminal according to claim 1, wherein the first transmission and the second transmission are data transmission.

9. A base station, comprising:

control circuitry, which, in operation, sets a first time offset in a first transmission of two transmissions, and changes to a second time offset for a second transmission of the two transmissions, the first transmission being prior to the second transmission, each of the first time offset and the second time offset being less than a length of a symbol; and reception circuitry, which, in operation, receives the second transmission based on the second time offset.

10. A transmission method, comprising setting, by a terminal, a first time offset in a first transmission of two transmissions, and changing, by the terminal, to a second time offset for a second transmission of the two transmissions, the first transmission being prior to the second transmission, each of the first time offset and the second time offset being less than a length of a symbol; and performing, by the terminal, the second transmission based on the second time offset.

11. A reception method, comprising setting, by a base station, a first time offset in a first transmission of two transmissions, and changing, by the base station, to a second time offset for a second transmission of the two transmissions, the first transmission being prior to the second transmission, each of the first time offset and the second time offset being less than a length of a symbol; and receiving, by the base station, the second transmission based on the second time offset.

* * * * *